No. 890,921. PATENTED JUNE 16, 1908.
K. A. PERKINS.
UMBRELLA HOLDER.
APPLICATION FILED JUNE 25, 1907.
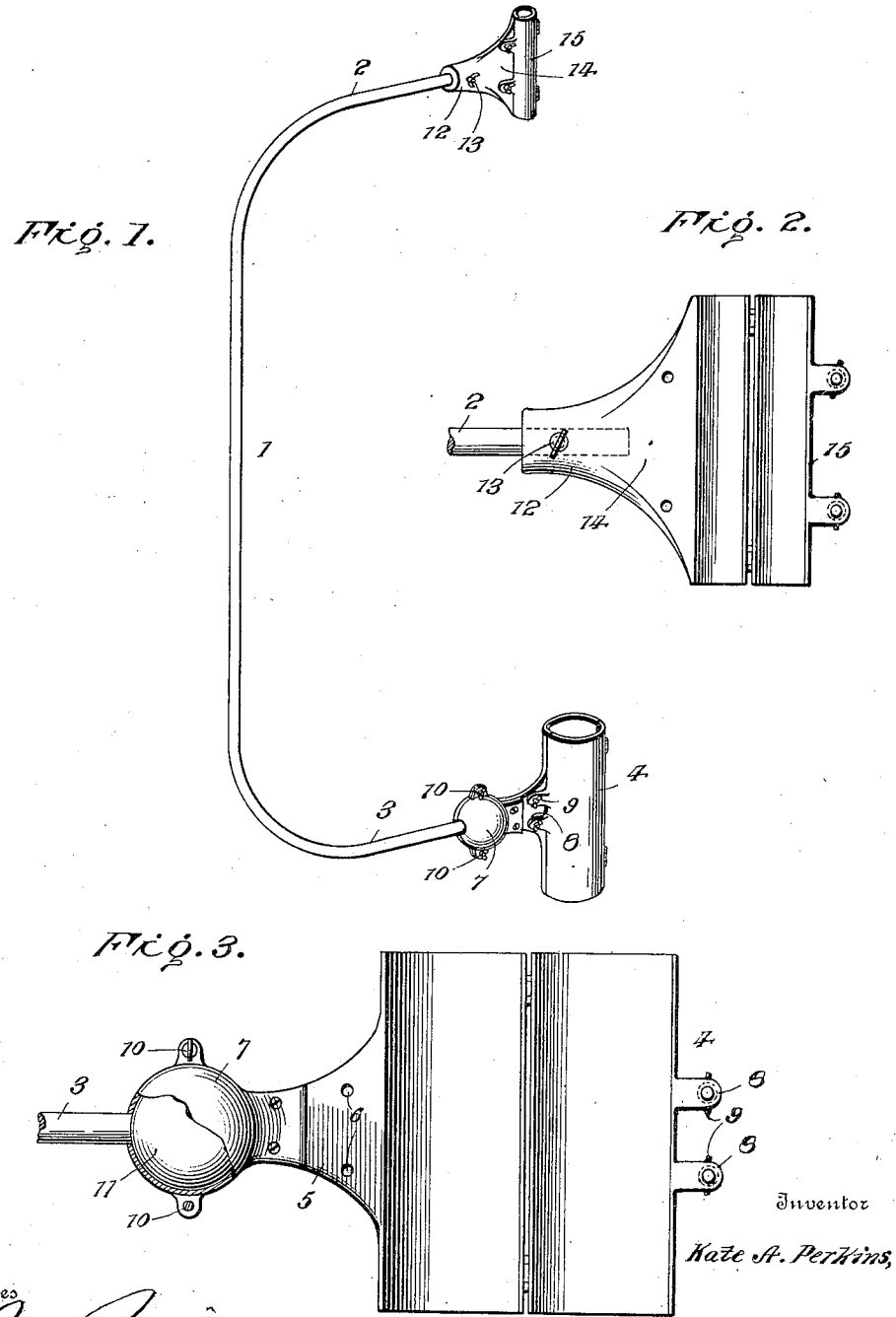

UNITED STATES PATENT OFFICE.

KATE ALICE PERKINS, OF BROWNWOOD, TEXAS.

UMBRELLA-HOLDER.

No. 890,921.   Specification of Letters Patent.   Patented June 16, 1908.

Application filed June 25, 1907. Serial No. 380,766.

*To all whom it may concern:*

Be it known that I, KATE ALICE PERKINS, citizen of the United States, residing at Brownwood, in the county of Brown and State of Texas, have invented certain new and useful Improvements in Umbrella-Holders, of which the following is a specification.

The present invention relates to an improved umbrella holder and more particularly to that type of holders which are designed to be employed in connection with bicycles and the like.

The object of the invention is to design an umbrella holder which is simple and inexpensive in its construction and can be readily applied to the bicycle or removed therefrom as may be found desirable.

For a full understanding of the invention and the merits thereof and also to acquire a knowledge of the details of construction and the means for effecting the result, reference is to be had to the following description and accompanying drawings, in which:

Figure 1 is a perspective view of an umbrella support embodying the invention; Fig. 2 is a detail view of the clamping device for engaging the umbrella handle; and, Fig. 3 is a similar view of the clamp for engaging the bicycle frame.

Corresponding and like parts are referred to in the following description and indicated in all the views of the drawings by the same reference characters.

Specifically describing the invention, the numeral 1 designates an upright rod having the end portions thereof extended laterally to form the upper and lower arms 2 and 3, respectively, the said arms being approximately parallel and in the same plane. The lower arm 3 carries a clamp 4 designed to engage a portion of the bicycle frame. This clamp 4 comprises a pair of hinged jaws, one of the jaws being formed with an extension 5 formed with threaded openings 6 and bearing a socket 7. The opposite jaw is provided with ears 8 carrying the clamping screws 9 designed to be received within the threaded opening 6 for the purpose of locking the jaws of the clamp in a closed position. The socket 7 is formed in two sections connected by the clamping members 10 and receiving a ball 11 at the extremity of the arm 3 between the same. This construction has the advantage of permitting the rod 1 to be held in an upright position regardless of the inclination of the portion of the bicycle frame to which the clamp 4 is applied. A sleeve 12 fits loosely over the extremity of the upper arm 2 and carries a set screw 13 by means of which it can be locked rigidly in position. An extension 14 corresponding to the extension 5 of the before mentioned clamp 4 is formed in connection with the sleeve 12 and carries a clamp 15 similar in construction to the clamp previously described, and designed to engage the handle of an umbrella or like member.

Having thus described the invention, what is claimed as new is:

The herein described umbrella holder for bicycles and the like comprising an upright rod, lateral arms projecting from the ends of the rod, the said arms being approximately parallel and in the same plane, a sleeve adjustably receiving the extremity of the upper arm, the said sleeve being formed with an extension, hinged clamping members carried by the extension for engaging the umbrella, a ball formed at the extremity of the lower arm, a socket receiving the ball, the said socket being formed in sections and one of the sections being provided with an extension, and a hinged jaw carried by the extension and coöperating therewith to form a clamp for engaging the bicycle frame.

In testimony whereof I affix my signature in presence of two witnesses.

KATE ALICE PERKINS. [L. S.]

Witnesses:
 CLYDE MCINTOSH,
 G. S. ZIMMERMANN.